(12) United States Patent
Gwen

(10) Patent No.: US 11,553,704 B2
(45) Date of Patent: Jan. 17, 2023

(54) INSECT SWATTING DEVICE

(71) Applicant: Patrick Gwen, Houston, TX (US)

(72) Inventor: Patrick Gwen, Houston, TX (US)

( * ) Notice: Subject to any disclaimer, the term of this patent is extended or adjusted under 35 U.S.C. 154(b) by 704 days.

(21) Appl. No.: 16/038,110

(22) Filed: Jul. 17, 2018

(65) Prior Publication Data

US 2020/0022355 A1    Jan. 23, 2020

(51) Int. Cl.
*A01M 3/02*      (2006.01)

(52) U.S. Cl.
CPC .............. *A01M 3/027* (2013.01); *A01M 3/02* (2013.01)

(58) Field of Classification Search
CPC ........... A01M 3/02; A01M 3/00; A01M 3/022
USPC ........................................ 43/137, 134, 136
See application file for complete search history.

(56) References Cited

U.S. PATENT DOCUMENTS

| | | | | |
|---|---|---|---|---|
| 1,277,216 A * | 8/1918 | Hutton | ..................... | A01M 3/02 43/137 |
| 3,905,146 A * | 9/1975 | Ralston | ................... | A01M 3/02 43/137 |
| 4,593,489 A * | 6/1986 | Gott | ......................... | A01M 3/02 43/137 |
| 4,617,754 A * | 10/1986 | Miley | ..................... | A01M 3/02 43/137 |
| 4,907,367 A * | 3/1990 | Herman | .................. | A01M 3/02 43/137 |
| 4,910,909 A * | 3/1990 | Johnson | ................... | A01M 3/02 43/137 |
| 5,568,699 A * | 10/1996 | Wadsworth | ............. | A01M 3/02 43/137 |
| 5,586,407 A * | 12/1996 | Raymond | ............... | A01M 3/02 43/137 |
| 6,105,306 A * | 8/2000 | Teng | ..................... | A01M 1/223 43/112 |
| 7,739,830 B1 * | 6/2010 | Wells | ....................... | A01M 3/02 43/137 |
| 8,915,014 B1 * | 12/2014 | Daugherty | .............. | A01M 3/02 43/137 |
| 9,179,663 B1 | 11/2015 | Holland | | |
| 9,854,794 B1 | 1/2018 | Hand | | |
| 2002/0178649 A1 * | 12/2002 | Betzen | ..................... | A01M 3/02 43/137 |
| 2008/0120897 A1 * | 5/2008 | Miller | ...................... | A01M 3/02 43/137 |

(Continued)

*Primary Examiner* — Darren W Ark
*Assistant Examiner* — Kevin M Dennis
(74) *Attorney, Agent, or Firm* — Craft Chu PLLC; Andrew W. Chu

(57) ABSTRACT

The device for swatting insects includes a shaft having a distal end and a proximal end, a handle portion mounted on the proximal end, and a paddle portion mounted on the distal end. The paddle portion absorbs excess force so that strong swings to strike the insect are less likely to damage the device. The paddle portion includes an elongated frame, a plurality of first flaps, and a plurality of second flaps. The elongated frame has top contact portion and a bottom contact portion. An initial configuration includes the flaps being planar and the top contact portion being furthest apart from the bottom contact portion in preparation to strike. A deformed configuration includes the flaps being bent upward from the frame and the top contact portion and the bottom contact portion closer to each other during the strike on the insect.

18 Claims, 3 Drawing Sheets

(56) References Cited

U.S. PATENT DOCUMENTS

| | | | |
|---|---|---|---|
| 2008/0155886 A1* | 7/2008 | Okuda | A01M 1/2055 43/132.1 |
| 2008/0190012 A1* | 8/2008 | Chanthalangsy | A01M 3/02 43/137 |
| 2009/0272026 A1* | 11/2009 | Su | A01M 3/025 43/137 |
| 2010/0132247 A1* | 6/2010 | Borovicka | A01M 3/025 43/137 |
| 2010/0162615 A1* | 7/2010 | Keralla | A01M 3/025 43/112 |
| 2013/0291428 A1* | 11/2013 | Wegscheider | A01M 3/022 43/137 |
| 2014/0165454 A1* | 6/2014 | Gordon, IV | A01M 3/025 43/137 |

* cited by examiner

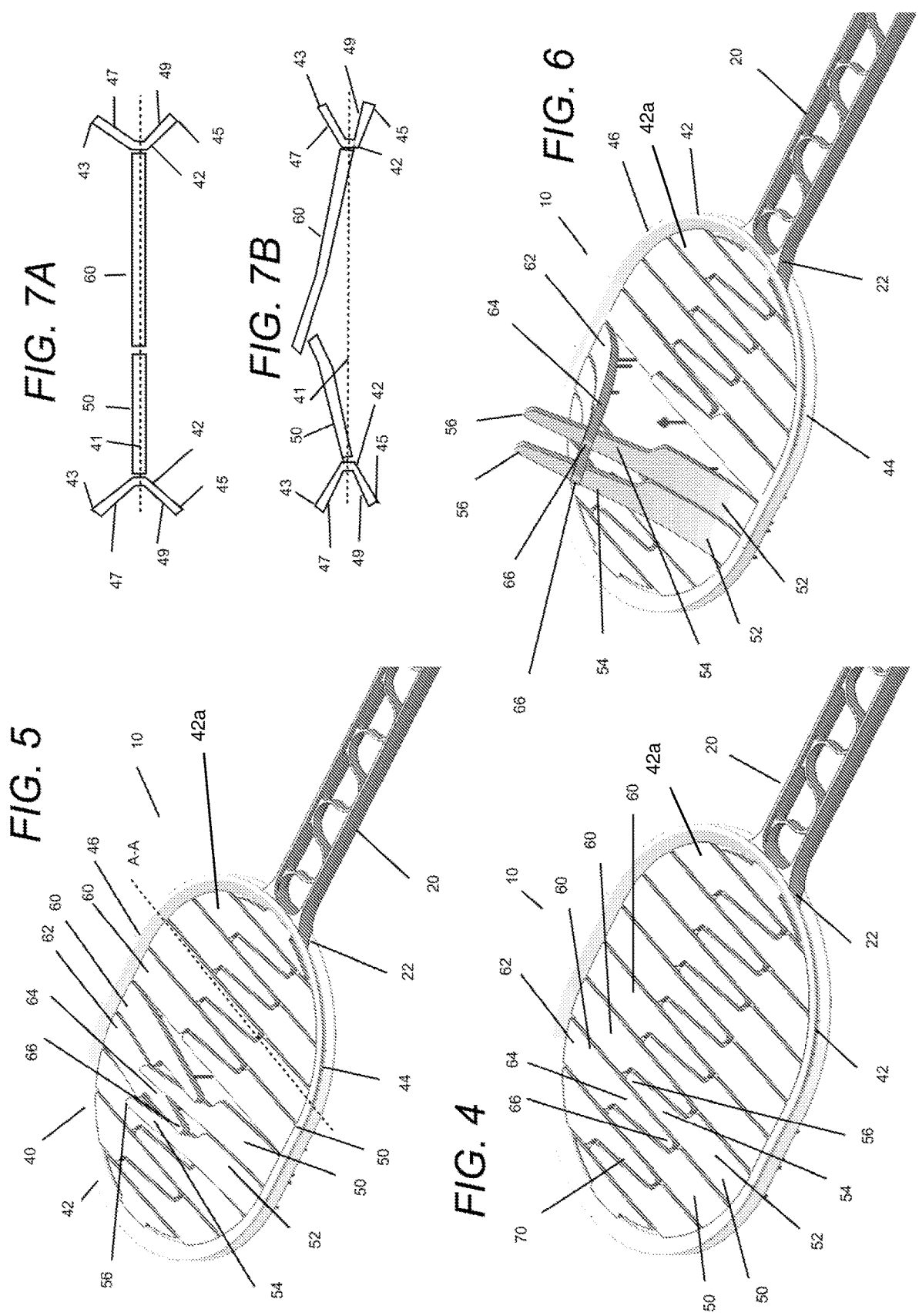

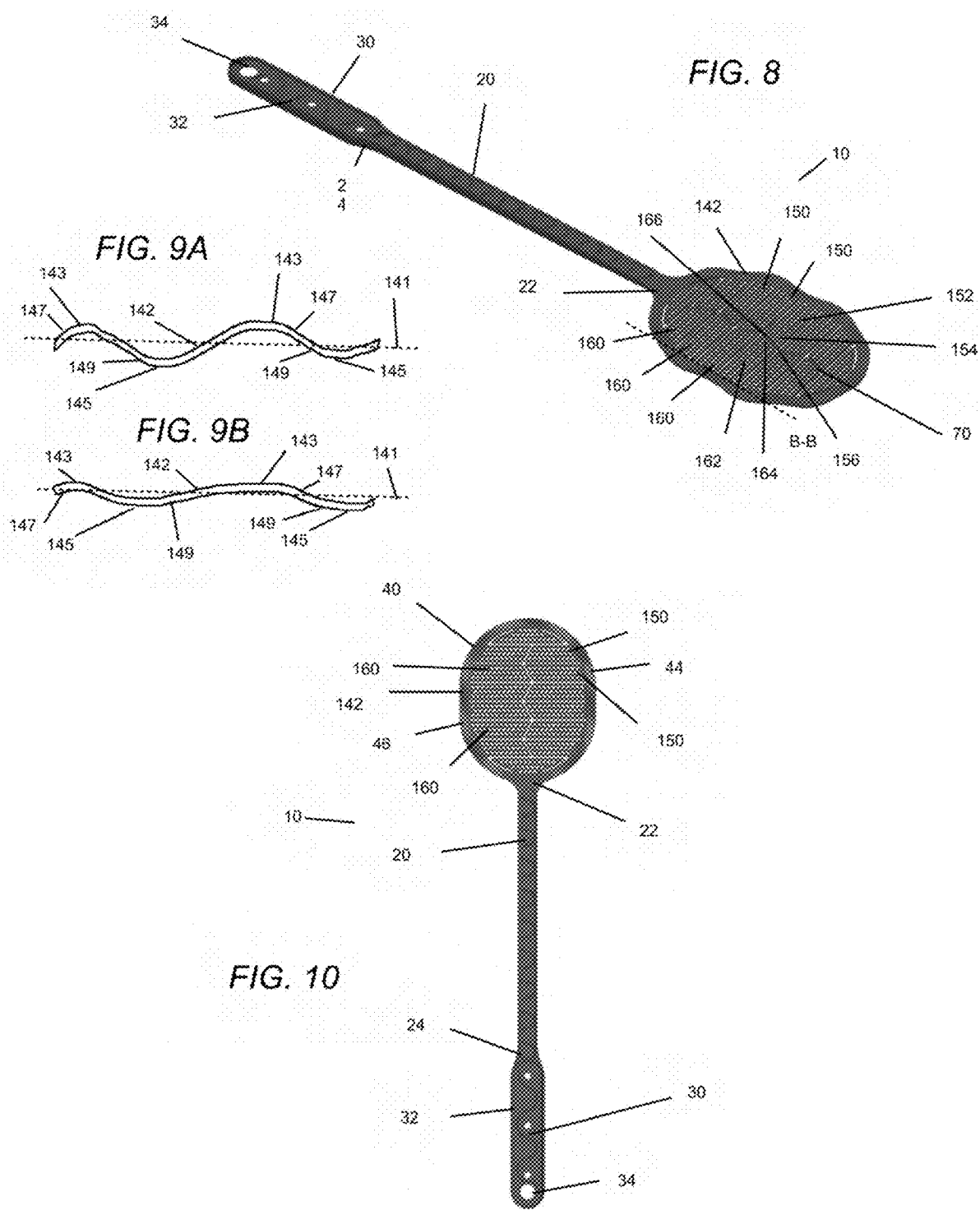

INSECT SWATTING DEVICE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to device for physically striking an insect. More particularly, the present invention relates to a swatting device to kill an insert or at least stun the insect so that the insect can be killed. Even more particularly, the present invention relates to an insect swatting device with a force absorbing means to prevent damage to the insect swatting device and to prolong the working life of the insect swatting device.

2. Description of Related Art Including Information Disclosed Under 37 CFR 1.97 and 37 CFR 1.98

Fly swatters are known devices for killing insects, particularly house flies. The basic components include a handle, shaft, and a paddle element. The handle is held by the user to strike an insect with the paddle element on the opposite end of the shaft from the handle. The conventional fly swatter extends the reach of the user, and the speed of the paddle element to reach the insect is greater than the speed of the user's hand.

Several patents and patent publications have addressed devices to swat insects.

U.S. Pat. No. 9,854,794, issued to Hand on 2 Jan. 2018, discloses a fly swatter having a removable adhesive sleeve. The handle and shaft are made of wire, and the paddle element is a sleeve that slides onto the frame. There is an adhesive on the sleeve to more reliably contact insects.

U.S. Pat. No. 9,179,663, issued to Holland on 10 Nov. 2015, describes a swatter apparatus with removable films. The paddle element is a plurality of films. After each successful use, the top film is removed and discarded.

U.S. Pat. No. 4,593,489, issued to Gott et al on 10 Jun. 1086, discloses another insect swatter. The paddle portion has J-shaped filaments to ensnare an insect.

In the prior art, the paddle element is generally uniform. The border of the paddle element has the same contact edges. The surface of the paddle element is the same in the middle and on the perimeter.

When the user swings the swatter, the amount of force applied by the paddle element to the insect generally exceeds the amount of force necessary to stun or kill an insect. The excessive amount of force can damage the paddle element. Especially when the paddle element strikes non-uniform surfaces, such as an edge of a window sill or corner of a table, the surface of the paddle element receives a sharp penetrating blow from the non-uniform surface, in addition to giving a slap to the insect. The border of the paddle element is also impacted and may break. These sharp penetrating blows can damage the paddle element with punctures and disfigurements. To a framed border or perimeter, the frame can sustain damage, such as bending and warping. The overall effectiveness and working life of the swatter is decreased.

Exceeding the amount of force needed to stun or kill an insect cannot be addressed by teaching users to swing more gently with swatters. The concern for damaging the swatter will not reliably outweigh the urgency to quickly strike, the adrenaline burst experienced in defending against an insect, or the satisfaction of landing a strong blow. The prior art swatters will have a persistent risk of damage and loss of working life.

It is an object of the present invention to provide an insect swatting device with a force absorbing means.

It is another object of the present invention to provide an insect swatting device with a paddle element with an initial configuration and a deformed configuration when striking the insect.

It is still another object of the present invention to provide an insect swatting device with a paddle element returns to the initial configuration from the deformed configuration after striking the insect.

It is another object of the present invention to provide an insect swatting device with a paddle element that deflects excess force to actuate the paddle element from an initial configuration to a deformed configuration.

It is still another object of the present invention to provide an insect swatting device with a paddle element comprised of two sets of alternating flaps from opposite sides of the paddle element.

It is yet another object of the present invention to provide an insect swatting device with a paddle element comprised of flaps being planar in the initial configuration and being bent in the deformed configuration.

It is still another object of the present invention to provide an insect swatting device with a paddle element comprised of a compressible elongated frame.

It is yet another object of the present invention to provide an insect swatting device with a paddle element comprised of a compressible frame with two rims in a V-formation with a fully extended shape in the initial configuration and a compressed shape in the deformed configuration.

It is yet another object of the present invention to provide an insect swatting device with a paddle element comprised of a compressible frame with at least two undulations with a fully extended shape in the initial configuration and a compressed shape in the deformed configuration.

It is an object of the present invention to provide an insect swatting device with a reduced risk of damage to the paddle element.

It is an object of the present invention to provide an insect swatting device with a longer working life.

These and other objectives and advantages of the present invention will become apparent from a reading of the attached specification.

BRIEF SUMMARY OF THE INVENTION

Embodiments of the present invention include a device for swatting insects with a means for absorbing force. The amount of force needed to strike an insect is actually very small compared to the amount of force exerted in a typical swing with a swatter. These typical swings are too strong, and the excess force can damage the swatter. The present invention includes a means for absorbing or re-directing that excess force so that there is less damage to the components of the swatter. The device for swatting insects includes a shaft having a distal end and a proximal end, a handle portion mounted on the proximal end, and a paddle portion mounted on the distal end.

The paddle portion has the means for absorbing force. The paddle portion can include an elongated frame aligned lengthwise with the shaft. The elongated frame can be integral or removably engageable with the shaft. The elongated frame has a first side and a second side, opposite the first side. A plurality of first flaps attach to the first side and extending toward the second side, and a plurality of second flaps attach to the second side and extending toward the first side. Each first flap has a corresponding second flap from the other side. The elongated frame has a top contact portion and bottom contact portion, opposite the top contact portion.

The paddle portion has an initial configuration with the first flaps being planar with the second flaps and with the top contact portion further apart from the bottom contact portion. The first flaps are adjacent to each other and adjacent to corresponding second flaps. In the initial configuration, the device is ready and prepared to strike. The paddle portion also has a deformed configuration with at least one first flap being bent upward from the elongated frame and with the top contact portion closer to the bottom contact portion. In the deformed configuration, the strike with the device is completed. The contact with the insect has bent at least one flap. The deformed configuration includes more than one flap being bent also, since the strike with the device usually contacts more than the just the insect. More than one flap can be bent in the deformed configuration. The deformed configuration includes at least a portion of the elongated frame being compressed by the excess force.

The device returns to the initial configuration after the strike. The flaps are flexible and resilient. The elongated frame is flexible and resilient. When there is excess force in the typical strike, the flaps are bent more and/or more flaps are bent and the elongate frame is compressed more. In the instance of a corner or sharp edge, more flaps are bent instead of the penetrating force of the corner rupturing the surface of the paddle portion. The paddle portion is not damaged, and there is no perforation or warping of the frame. The flaps and the elongated frame actuating between the initial configuration and the deformed configuration absorb the excess force. The excess force is not exerted to damage the surface of the paddle portion.

Embodiments of the present invention include each first flap being comprised of a first attachment portion and a first finger portion made integral with the first attachment portion. The first attachment portion attaches to the first side of the elongated frame and has the first finger portion opposite the first side. Similarly, each second flap is comprised of a second attachment portion and a second finger portion made integral with the second attachment portion. The second attachment portion attaches to the second side of the elongated frame and has the second finger portion opposite the second side. In some embodiments, the first finger portion is triangular and forms a first point, and the second finger portion is triangular and forms a second point. Each first flap has a corresponding second flap, and each first finger portion is complementary in shape with a corresponding second finger portion. The proportion of attachment portion to finger portion is variable in different embodiments of the flaps.

Further embodiments include the first flaps and the second flaps being comprised of a perforated material so as to allow air to pass through the flaps. The perforations allow the paddle portion to reach insects by disturbing less air and giving less warning to insects. Also, the first flaps and the second flaps can form a center column, so that the center column is the target area for insects. The center column is the most flexible area of the paddle portion. In some embodiments, the finger portions of the flaps interlace to form the center column. The center column can have different dimensions, just as the proportion of attachment portion to finger portion varies in different embodiments of flaps or fins. The center column absorbs the most excess force, while still killing or at least stunning the insect.

BRIEF DESCRIPTION OF THE SEVERAL VIEWS OF THE DRAWINGS

FIG. 4 is an isolated perspective view of the paddle portion of the insect swatting device in the initial configuration.

FIG. 5 is another isolated perspective view of the paddle portion of the insect swatting device transitioning from the initial configuration to the deformed configuration.

FIG. 6 is still another isolated perspective view of the paddle portion of the insect swatting device in the deformed configuration.

FIG. 7A is a schematic view of a cross-section of Line A-A in FIG. 5 in the initial configuration.

FIG. 7B is a schematic view of a cross-section of Line A-A in FIG. 5 in the deformed configuration.

FIG. 8 is a perspective view of another embodiment of the insect swatting device, according to the present invention.

FIG. 9A is a schematic view of a cross-section of Line B-B in FIG. 8 in the initial configuration.

FIG. 9B is a schematic view of a cross-section of Line B-B in FIG. 8 in the deformed configuration.

FIG. 10 is a front elevation view of the embodiment of the insect swatting device, according to FIG. 8.

DETAILED DESCRIPTION OF THE INVENTION

Figure 3:
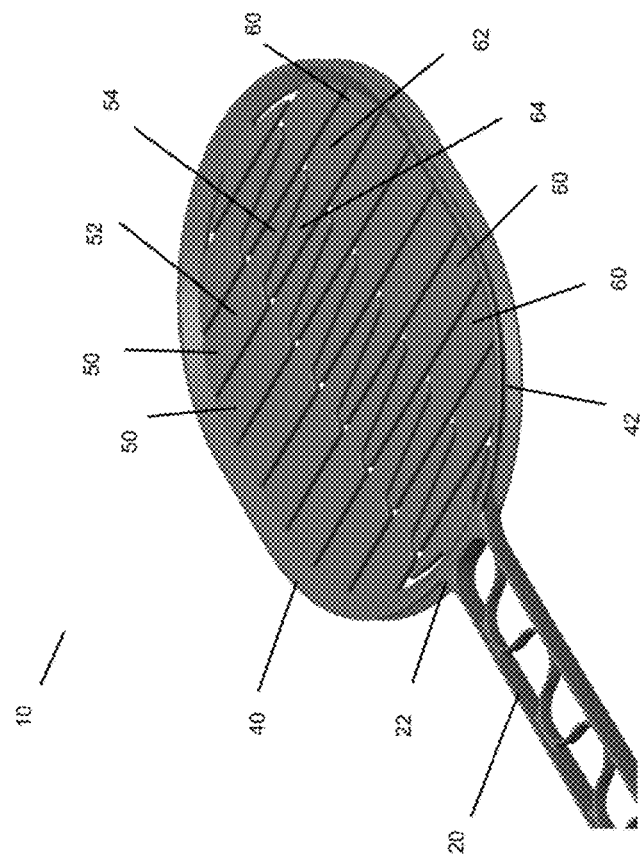
FIG. 3 is an isolated perspective view of a distal portion of the insect swatting device, according to FIG. 1.
Figure 2:
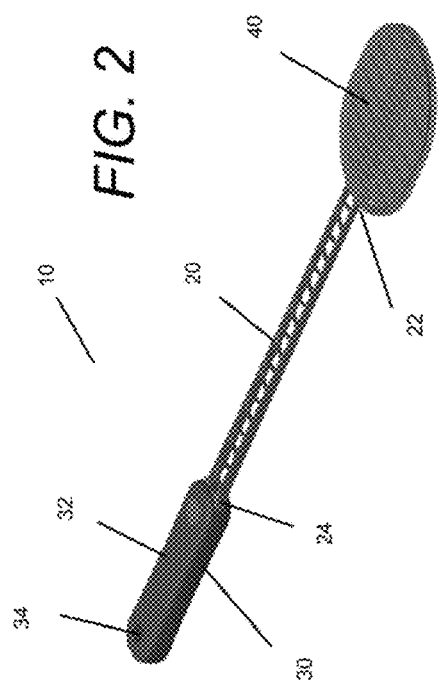
FIG. 2 is a Perspective view of the embodiment of the insect swatting device, according to FIG. 1.
Figure 1:
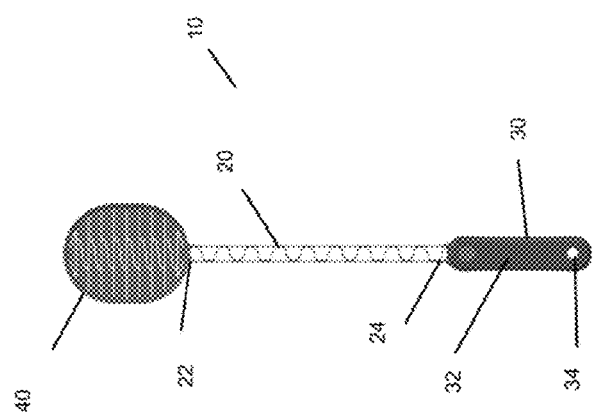
FIG. 1 is a front elevation view of an embodiment of the insect swatting device, according to the present invention.

Referring to FIGS. 1-10, the present invention is a device 10 for swatting insects. The device 10 includes a shaft 20, a handle portion 30, and a paddle portion 40. The shaft 20 has a distal end 22 and a proximal end 24. The handle portion 30 is mounted on the proximal end 24, and the paddle portion 40 is mounted on the distal end 22. FIGS. 1-3, 8 and 10 show the handle portion 30 being comprised of a grip surface 32 and a mounting hole 34. The grip surface 32 allows the user to grasp and orient the paddle portion 40 to deliver a striking blow to the insect. The mounting hole 34 allows for storage of the device 10.

The device 10 absorbs excess force or at least redirects excess force to avoid damage to the device 10. In particular, the paddle portion 40 will have more effectiveness and a longer working life. The excess force originates from the normal swing of the device 10 to strike an insect. The actual amount of force needed to stun or kill an insect is very small. The swing of the device 10 typically generates more force than necessary, even if the user intentionally tries to soften a striking blow to the insect. When the striking blow lands on an irregular non-planar surface, such as a corner of a table or ledge of a window sill, the paddle portion of the prior art can be damaged. Excess force may crack or puncture the paddle portion or bend the frame of the prior art. That damage reduces the effectiveness, when the paddle portion of the prior art can no longer make regular planar contact.

FIGS. 4-6 and 8-10 show embodiments of the paddle portion 40, according to the present invention. The paddle portion 40 is comprised of an elongated frame 42, 142 aligned lengthwise with the shaft. The longer dimension of the frame 42, 142 is parallel to the shaft 20. The elongated frame 42, 142 has a first side 44 and a second side 46 opposite the first side 44. The elongated frame 42, 142 also has a top contact portion 43, 143 and a bottom contact portion 45, 145 opposite the top contact portion 43, 143. The elongated frame 42, 142 is comprised of the first side 44, the second side 46 opposite the first side, the top contact portion 43, and the bottom contact portion 45 opposite the top contact portion so as to define a frame plane 42 within the elongated frame. The first side 44 is between the top contact portion 43 and the bottom contact portion 45. The second side 46 is also between the top contact portion 43 and the bottom contact portion 45, but opposite the first side 44. FIGS. 1-6, 8 and 10 show the paddle portion 40 made integral with the shaft 20. In alternate embodiments, the paddle portion 40 can be removably attached, such as a snap fit engagement between the paddle portion 40 and the shaft 20. The paddle portion 40 may be removable for interchangeability of other paddle portions. A used paddle portion can be replaced.

The embodiment of the paddle portion 40 also includes a plurality of first flaps 50, 150 being attached to the first side 44 between the top contact portion 43 and the bottom contact portion 45 and extending toward the second side 46 within the frame plane 42a, and a plurality of second flaps 60, 160 being attached to the second side 46 between the top contact portion 43 and the bottom contact portion 45 and extending toward the first side 44 and the plurality of first flaps 50, 150 within the frame plane 42a. The plurality of first flaps 50, 150 extend toward the plurality of second flaps 60, 160 from the first side 44 within the frame plane 42 without overlapping. FIGS. 4-6, 8 and 10 show that each first flap 50, 150 has a corresponding second flap 60, 160 on the other side, and each first flap 50, 150 is complementary in shape with a corresponding second flap 60, 160.

In an initial configuration, the first flaps 50, 150 are planar with the second flaps 60, 160 within the frame plane 42a of the elongated frame 42, 142. The first flaps 50, 150 on the first side 44 are adjacent to each other and adjacent to corresponding second flaps 60, 160 on the second side 46 within the frame plane 42a of the elongated frame 42, 142. The initial configuration is the resting position of the paddle portion 40, wherein the paddle portion 40 is ready to strike in the initial configuration of FIGS. 4, 8 and 10. The planar first flaps 50, 150 and second flaps 60, 160 form a regular and predictable flat surface without overlapping each other to strike an insect.

In a deformed configuration of the paddle portion 40, at least one first flap 50, 150 is bent upward from the elongated frame 42, 142. Alternatively, at least one second flap 60, 160 can be bent upward from the elongated frame 42, 142. The deformed configuration of FIG. 6 corresponds to the smashing position of the paddle portion 40, wherein the paddle portion 40 has struck the insect. The bent first flap or bent second flap corresponds to the insect being contacted by that bent first flap or bent second flap. The insect can cause the bend or another structure, such as a corner of a table or ledge of a window sill, can cause the bend. FIG. 5 shows the transition between the initial configuration (FIG. 4) and the deformed configuration (FIG. 6).

The deformed configuration can also include more than one first flap 50, 150 or more than one second flap 60, 160 or more than both the one first flap 50, 150 and corresponding second flap 60, 160 as in FIGS. 4-6, 8 and 10. Additionally, the deformed configuration may include more than one pair of a first flap 50, 150 and corresponding second flap 60, 160. FIG. 6 shows adjacent pairs of first and second flaps 50, 60 being bent by the same structure and force exerted on the paddle portion 40. The number of flaps or the number of pairs of flaps is determine by the strike and the surface being struck. The deformed configuration includes at least one first flap 50, 150 being bent, but various embodiments include at least on second flap, at least a pair of a first flap and a corresponding second flap, and pairs of first flaps and corresponding second flaps.

FIGS. 1-6 show embodiments of a first flap 50 and a second flap 60. Each first flap 50 is comprised of a first attachment portion 52 and a first finger portion 54 made integral with the first attachment portion 52. The first attachment portion 52 attaches to the first side 44 of the elongated frame 42. The first finger portion 54 is opposite the first side 44 relative to the first attachment portion 52. The first finger portion 54 is triangular and forms a first point 56. In a mirror image, each second flap 60 is comprised of a second attachment portion 62 and a second finger portion 64 made integral with the second attachment portion 62. The second attachment portion 62 attaches to the second side 46 of the elongated frame 42. The second finger portion 64 is opposite the second side 46 relative to the second attachment portion 62. The second finger portion 64 is also triangular and forms a second point 66.

FIGS. 8 and 10 show alternate embodiments of a first flap 150 and a second flap 160. Each first flap 150 is comprised of a first attachment portion 152 and a first finger portion 154 made integral with the first attachment portion 152. The first attachment portion 152 attaches to the first side 44 of the elongated frame 142. The first finger portion 154 is opposite the first side 44 relative to the first attachment portion 152. The first finger portion 154 is triangular and forms a first point 156. In a mirror image, each second flap 160 is comprised of a second attachment portion 162 and a second finger portion 164 made integral with the second attachment portion 162. The second attachment portion 162 attaches to the second side 46 of the elongated frame 142. The second finger portion 164 is opposite the second side 46 relative to the second attachment portion 162. The second finger portion 64 is also triangular and forms a second point 166. The embodiments of FIGS. 8 and 10 show a different proportion of the attachment portion and finger portion for each flap or fin. The present invention includes different dimensions for the relationship of the attachment portion fixed to the frame and the finger portions interlacing with corresponding finger portions from the other side of the frame. The amount of interlacing is variable.

For the embodiments of FIGS. 4-6, 8 and 10, the initial configuration includes the first point 56, 156 being adjacent a corresponding second attachment portion 62, 162 and the first attachment portion 52, 152 being adjacent corresponding second point 66, 166. The paddle portion 40 remains planar, even with the first finger portion 54, 154 and second finger portion 64, 164 being narrower than the respective first attachment portion 52, 152 and second attachment portion 62, 162. Furthermore, each first attachment portion 52, 152 is adjacent to another first attachment portion 52, 152 of an adjacent first flap 50, 150 on the first side 44. In a mirror image, each second attachment portion 62, 162 is adjacent to another second attachment portion 62, 162 of an adjacent second flap 60, 160 on the second side 46. However, each first finger portion 54, 154 alternates with a corresponding second finger portion 64, 164 with each first finger portion 54, 154 being adjacent the corresponding second finger portion 64, 164. The first flaps 50, 150 and second flaps 60, 160 are modular, and the relationships between the pair of one first flap 50, 150 and respective second flap 60, 160 is repeated in the paddle portion 40.

With the narrowing of the first attachment portion 52, 152 to the first finger portion 54, 154 and the narrowing of the second attachment portion 62, 162 to the second finger portion 64, 164, the initial configuration further includes the first point 56, 156 being adjacent a corresponding second attachment portion 62, 162 and the first attachment portion 52, 152 being adjacent a corresponding second point 66, 166. The first point 56, 156 is planar with the corresponding second attachment portion 62, 162, and the first attachment portion 52, 152 is planar with the corresponding second point 66, 166.

For the embodiments of FIGS. 4-6, 8 and 10, the deformed configuration includes at least one first attachment portion 52, 152 being bent upward from the elongated frame 42, 142. The at least one first finger portion 54, 154 corresponding to the at least one first attachment portion 52, 152 bends away from a corresponding second finger portion 64, 164. The at least one first finger portion 54, 154 is angled relative to the corresponding second finger portion 64, 164. Furthermore, the at least one first point 56, 156 is bent upward also. The at least on first point is also angled upward from the corresponding second finger portion 64, 164.

The planar relationship of the initial configuration is broken, when the device 10 strikes in the deformed configuration. In this example, only one flap is affected to actuate from the initial configuration to the deformed configuration, which corresponds to a strike of the device 10 contacting the insect on the one flap. The flaps are modular so that, alternatively, the one flap could be a second flap 60, 160 instead of a first flap 50, 150. The analogous structures would be involved for the second flap 60, 160 instead of the first flap 50, 150. Further embodiments relate to different strikes by the device 10, which correspond to different embodiments of the deformed configuration. Strikes will not typically be so accurately targeted to hit the insect with a single flap.

FIG. 6 shows an embodiment of the deformed configuration of the paddle portion 40, when a strike involves more than one flap. At least one first attachment portion 52 is bent upward from the elongated frame 42. The at least one first finger portion 54 corresponding to the at least one first attachment portion 52 bends away from a corresponding second finger portion 64. The at least one first finger portion 54 is angled relative to the corresponding second finger portion 64. The at least one first point 56 is bent upward also. The at least on first point 56 is also angled upward from the corresponding second finger portion 64. At the same time, the corresponding second attachment portion 62 is bent upward from the elongated frame 42. The corresponding second finger portion 64 bends away from the at least one first finger portion 54. The corresponding second finger 64 is angled relative to the at least one first finger portion 54. Furthermore, the corresponding second point 66 is bent upward also. The second point is also angled upward from the at least one first finger portion 54. The paddle portion 40 moves back and forth between the initial configuration and the deformed configuration between FIGS. 4 to 5 to 6 to 5 and back to 4.

In the embodiments of FIGS. 1-10, the first flaps 50, 150 can be comprised of a perforated material so as to allow air to pass through the first flaps 50, 150. Similarly, the second flaps 60, 160 are comprised of the perforated material so as to allow air to pass through the second flaps 60, 160, as shown in FIGS. 8 and 10. Also, the interlacing of the first flaps 50, 150 and the second flaps 60, 160 form a center column 70 in FIGS. 4 and 8. The center column 70 can be defined by the finger portions 54, 154, 64, 164 of the flaps 50, 60, 150, 160. FIG. 8 shows a zig zag pattern in the center column 70.

Embodiments also include the flexibility of the first attachment portion 52, 152 being less than flexibility of the first finger portion 54, 154 and similarly, the flexibility of the second attachment portion 62, 162 is less than flexibility of the second finger portion 64, 164. The first finger portion 56, 156 can also bend more than the first attachment portion 52, 152, and the second finger portion 66, 166 can bend more than the second attachment portion 62, 162. The first finger portions 54, 154 interlacing with corresponding second finger portions 64, 164 in the center column 70 such that the center column 70 is the most flexible part of the paddle portion 40. The most excess force is absorbed or re-directed on the center column 70. More damage can be prevented by striking with the center column 70 as the main contacting surface for the targeted insect.

FIGS. 7A, 7B, 9A, and 9B disclose another aspect of the force absorbing or re-directing means of the paddle portion 40. FIG. 7A shows the initial configuration of the elongated frame 42 with a top rim 47 or conical ring and a bottom rim 49 or reverse conical ring in a V-formation across each other on a midline 41. The rims 47, 49 are oriented to extend away from each other. The first flap 50 and the second flap 60 are planar with the midline 41. In this embodiment, the top contact portion 43 is on a distal end of the top rim 47 and the bottom contact portion 45 is on a distal end of the bottom rim 49. In the deformed configuration, the top rim 47 is compressed toward the bottom rim 49 in FIG. 7B. This configuration absorbs excess force of the strike with the device 10 by compressing the elongated frame 42 toward the midline 41 instead of being warped. The elongated frame 42 is flexible and resilient to return to the initial configuration, after the strike. More strikes can be made with the device 10 without permanently damaging the elongated frame 42. The structure of the elongated frame 42 is another aspect of the force absorbing means of the present invention.

FIG. 9A show another embodiment of the elongated frame 142 in the initial configuration. The elongated frame 142 is comprised of a top undulation 147 and a bottom undulation 149 with a midline 141. This embodiment of the elongated frame 142 can have the top undulations 147 made integral with the bottom undulations 149. The first flaps 150 and the second flaps 160 are planar with the midline 141. In this embodiment, the top contact portion 143 is on the top undulation 147 and the bottom contact portion 145 is on the bottom undulation 149. In the deformed configuration, the top undulation 147 is compressed toward the bottom undulation 149 in FIG. 9B. This embodiment also absorbs excess force to prevent damage to the elongated frame 142 of the paddle portion 40.

The present invention provides an insect swatting device with a force absorbing means to prevent damage and to increase the working life of the device. There is a paddle portion with an initial configuration and a deformed configuration. Excess force from the typical swing and strike on the insect is used to actuate the paddle portion from the initial configuration to the deformed configuration, instead of permanent disfigurement by puncture or warping of the paddle portion. The paddle portion is made of a flexible and resilient material sufficient to return the deformed configuration to the initial configuration, after the strike is completed.

Embodiments of the paddle portion include first flaps and second flaps corresponding to each other in a modular relationship. The flaps attach to opposite sides and form a center column. The paddle portion also includes an elongated frame with a top contact portion and a bottom contact portion. The bottom contact portion is spaced apart from the top contact portion.

In the initial configuration, the flaps are all planar, and there is a set distance between the top contact portion and the bottom contact portion of the elongated frame. The flaps alternate with each other from the opposite side in a center column. The elongated frame is in a fully extended shape with the largest distance between the top contact portion and the bottom contact portion. The paddle portion is generally planar, and the device is ready to strike. In the deformed configuration, the flaps are bent upward from the elongated frame, and the top contact portion is closer to the bottom contact portion. The elongated frame is compressed in the deformed configuration. The elongated frame can have a V-shaped cross-section or an undulating form. The insect swatting device absorbs excess force by redirecting force to compress the elongated frame or to bend the flaps. The force needed to kill or stun an insect is maintained because that amount of force is so small. The present invention prevents damage by a paddle portion with structures to withstand excess force with a reduced risk of damage to the paddle portion and a longer working life of the device.

The foregoing disclosure and description of the invention is illustrative and explanatory thereof. Various changes in the details of the illustrated structures, construction and method can be made without departing from the true spirit of the invention.

I claim:

1. A device for swatting insects, comprising:
    a shaft having a distal end and a proximal end;
    a handle portion mounted on said proximal end; and
    a paddle portion mounted on said distal end,
    wherein said paddle portion is comprised of:
        an elongated frame aligned lengthwise with said shaft, said elongated frame being comprised of a first side, a second side opposite said first side, a top contact portion, and a bottom contact portion opposite said top contact portion so as to define a frame plane within said elongated frame, said first side being between said top contact portion and said bottom contact portion, said second side being between said top contact portion and said bottom contact portion opposite said first side, said elongated frame being fixed to said shaft at said distal end;
        a plurality of first flaps being attached to said first side between said top contact portion and said bottom contact portion and extending lengthwise between said top and bottom contact portions toward said second side within said frame plane; and
        a plurality of second flaps being attached to said second side between said top contact portion and said bottom contact portion and extending lengthwise between said top and bottom contact portions within said frame plane toward said first side and said plurality of first flaps, said plurality of first flaps extending within said frame plane toward said plurality of second flaps from said first side,
    wherein each first flap corresponds to one of said plurality of second flaps, each first flap being complementary in shape with the corresponding one of said plurality of second flaps without overlapping the corresponding one of said plurality of second flaps,
    wherein said paddle portion has an initial configuration, said plurality of first flaps being planar with said plurality of second flaps within said frame plane of said elongated frame, said plurality of first flaps being adjacent to each other and adjacent to each corresponding one of said plurality of second flaps within said elongated frame so as to reduce an amount of force applied to an insect by said paddle portion,
    wherein said paddle portion has a deformed configuration, at least one of said plurality of first flaps being bent upward from said frame plane of said elongated frame,
    wherein said top contact portion and said bottom contact portion have a set amount of separation from each other in said initial configuration, and
    wherein said top contact portion and said bottom contact portion have an amount of separation less than said set amount of separation from each other in said deformed configuration.

2. The device for swatting insects, according to claim 1, wherein said handle portion is comprised of a grip surface and a mounting hole.

3. The device for swatting insects, according to claim 1,
    wherein each first flap is comprised of a first attachment portion and a first finger portion made integral with said first attachment portion, said first attachment portion being attached to said first side of said elongated frame and having said first finger portion opposite said first side,
    wherein said first finger portion is triangular and forms a first point opposite said first attachment portion,
    wherein each second flap is comprised of a second attachment portion and a second finger portion made integral with said second attachment portion, said second attachment portion being attached to said second side of said elongated frame and having said second finger portion opposite said second side,
    wherein said second finger portion is triangular and forms a second point opposite said second attachment portion, and
    wherein said first attachment portion, said first finger portion, said second attachment portion, and said second finger portion are planar within said frame plane of said elongated frame in said initial configuration without overlap.

4. The device for swatting insects, according to claim 3, wherein said first point is adjacent said corresponding second attachment portion in said initial configuration, and
wherein said first attachment portion is adjacent said corresponding second point in said initial configuration.

5. The device for swatting insects, according to claim 3, wherein each first attachment portion is only adjacent to another first attachment portion of said adjacent one of said plurality of first flaps in said initial configuration,
wherein each first finger portion alternates with said corresponding second finger portion, each first finger portion being adjacent said corresponding second finger portion in said initial configuration.

6. The device for swatting insects, according to claim 5, wherein said first point is adjacent said corresponding second attachment portion, said first point being planar with said corresponding second attachment portion within said frame plane of said elongated frame in said initial configuration, and
wherein said first attachment portion is adjacent said corresponding second point, said first attachment portion being planar with said corresponding second point within said frame plane of said elongated frame in said initial configuration.

7. The device for swatting insects, according to claim 3, wherein at least one of said first attachment portions is bent upward from said frame plane of said elongated frame and nonplanar with said corresponding second attachment portion in said deformed configuration, and
wherein at least one of said first finger portions corresponding to said at least one of said first attachment portions bends away from said corresponding second finger portion, said at least one of said first finger portions being angled relative to said corresponding second finger portion in said deformed configuration.

8. The device for swatting insects, according to claim 7, wherein at least one of said first points corresponding to said at least one of said first attachment portions bends upward from said corresponding second finger portion, said at least one of said first points being angled upward from said corresponding second finger portion in said deformed configuration.

9. The device for swatting insects, according to claim 3, wherein at least one of said plurality of second flaps corresponding to said at least one of said plurality of first flaps is bent upward from said elongated frame in said deformed configuration, and
wherein said second finger portion of said at least one of said plurality of second flaps being nonplanar with said first attachment portion and said first finger portion in said deformed configuration.

10. The device for swatting insects, according to claim 9, wherein at least one of said first attachment portions is bent upward from said elongated frame in said deformed configuration,
wherein at least one of said first finger portions corresponding to said at least one of said first attachment portions bends away from a said corresponding second finger portion in said deformed configuration, said at least one of said first finger portions being angled relative to said corresponding second finger portion in said deformed configuration,
wherein said at least one of said first finger portions is nonplanar with said second finger portion and said second attachment portion in said deformed configuration,
wherein said corresponding second attachment portion is bent upward from said elongated frame in said deformed configuration,
wherein said corresponding second finger portion corresponding to said at least one of said first attachment portions bends away from said at least one of said first finger portions, said corresponding second finger portion being angled relative to said at least one of said first finger portions in said deformed configuration, and
wherein said corresponding second finger portion is nonplanar with said at least one of said first attachment portions and said at least one of said first finger portions in said deformed configuration.

11. The device for swatting insects, according to claim 10, wherein at least one of said first points corresponding to said at least one of said first attachment portions bends upward from said corresponding second finger portion, said at least one of said first points being angled upward from said corresponding second finger portion in said deformed configuration, and
wherein said corresponding second point corresponding to said corresponding second attachment portion bends upward from said at least one of said first finger portions, said corresponding second point being angled upward from said at least one of said first finger portions in said deformed configuration.

12. The device for swatting insects, according to claim 1, wherein said plurality of first flaps are comprised of a perforated material so as to allow air to pass through said plurality of first flaps, and
wherein said plurality of second flaps are comprised of said perforated material so as to allow air to pass through said plurality of second flaps.

13. The device for swatting insects, according to claim 3, wherein said plurality of first flaps and said plurality of second flaps form a center column within said elongated frame.

14. The device for swatting insects, according to claim 13, wherein flexibility of said first attachment portion is less than flexibility of said first finger portion, and
wherein flexibility of said second attachment portion is less than flexibility of said second finger portion.

15. The device for swatting insects, according to claim 14, wherein said first finger portion bends more than said first attachment portion, and
wherein said second finger portion bends more than said second attachment portion.

16. The device for swatting insects, according to claim 13, wherein each respective one of said first finger portions alternates with each corresponding one of said second finger portions in said center column.

17. The device for swatting insects, according to claim 1, wherein said elongated frame is comprised of a top rim and a bottom rim in a V-formation with a midline, said plurality of first flaps and said plurality of second flaps being planar with said midline, said top contact portion being on a distal end of said top rim, said bottom contact portion being on a distal end of said bottom rim.

18. The device for swatting insects, according to claim 17, wherein said top rim is compressed toward said bottom rim in said deformed configuration.

* * * * *